US005945986A

United States Patent [19]
Bargar et al.

[11] Patent Number: 5,945,986
[45] Date of Patent: Aug. 31, 1999

[54] SILENT APPLICATION STATE DRIVEN SOUND AUTHORING SYSTEM AND METHOD

[75] Inventors: Robin Bargar; Insook Choi, both of Urbana, Ill.

[73] Assignee: University of Illinois at Urbana-Champaign, Champaign, Ill.

[21] Appl. No.: 08/864,878

[22] Filed: May 19, 1997

[51] Int. Cl.$^6$ ........................................................ G06F 3/16
[52] U.S. Cl. ............................................. 345/302; 345/326
[53] Field of Search ..................................... 345/302, 326, 345/329, 330, 331, 335, 339, 348, 349; 707/501, 513; 84/601, 603

[56] References Cited

U.S. PATENT DOCUMENTS

| | | | |
|---|---|---|---|
| 5,223,828 | 6/1993 | McKiel, Jr. ............................ | 340/825.19 |
| 5,226,160 | 7/1993 | Waldron et al. ....................... | 395/685 |
| 5,286,908 | 2/1994 | Jungleib ................................. | 84/603 |
| 5,293,385 | 3/1994 | Hary ..................................... | 395/183.14 |
| 5,315,057 | 5/1994 | Land et al. ............................. | 84/601 |
| 5,371,854 | 12/1994 | Kramer ................................. | 704/270 |
| 5,600,777 | 2/1997 | Wang et al. ........................... | 345/326 |
| 5,740,436 | 4/1998 | Davis et al. ........................... | 395/651 |
| 5,771,041 | 6/1998 | Small .................................... | 345/326 |

OTHER PUBLICATIONS

Microsoft(R) Windows NT(R), Version 4.0, 1996, Screen Printouts pp. 1–5.

Bargar et al., "Model–based interactive sound for an immersive virtual environment", University of Illinois at Chicago, four pages; 1994.

*Primary Examiner*—Stephen S. Hong
*Attorney, Agent, or Firm*—Greer, Burns & Crain, Ltd.

[57] ABSTRACT

A system and method for authoring and providing sounds in real time in conjunction with running of a silent computer application program wherein the silent computer application is of a type that is capable of having a plurality of different pre-selected states. The silent application is modified to include a function that evaluates the pre-selected states of the silent computer program application, stores data describing each of the different pre-selected states in a respective state-describing message array; and sends a plurality of message tags, wherein each one of the plurality of message tags includes a respective one of the state-describing message arrays. The system for authoring and providing sounds additionally comprises a sound authoring program which exists as a process separate from the silent application. The sound authoring program comprises a message tag translator that receives the message tags sent from the silent application. The sound authoring program parses each of the message tags it receives to extract the state-describing message array therefrom. The sound authoring program identifies a message group associated with each message tag identified by the parsing means and maps the data from the state-describing message array of the message tag to at least one sound production message associated with the message tag by the message group. The sound production message is then passed to conventional sound producing algorithms or generators in a sound rendering application. For a given state of a silent application, more than one message group may be provided permitting a designated state of the silent application to generate different sounds at different times according to the real-time specification of the user. The sound authoring program and the silent application may be implemented in software or hardware and may be located on a single platform or may be located in a networked environment. The relational dynamics between silent applications and sounds are defined in the sound authoring structure as a specific and unique stage that can be independently refined, upgraded, modified, scaled, and developed apart from the silent application.

21 Claims, 10 Drawing Sheets

Microfiche Appendix Included
(9 Microfiche, 815 Pages)

| SOUND PRODUCTION MESSAGE FORMAT: | |
|---|---|
| MESSAGE NAME— | USUALLY DESCRIBES A FUNCTION CALLED BY THE MESSAGE |
| RECIPIENT— | A SOUND GENERATING OR SOUND PROCESSING FUNCTION |
| TIME DELAY— | TIME IN SECONDS WHEN MESSAGE IS EXECUTED AFTER TAG ARRIVES |
| PARAMETER DATA— | FIXED VALUE OR INDEXED TO ONE OR MORE VALUES PASSED IN FROM THE REQUEST DATA ARRAY |
| PARAMETER PROCESSOR— | OPTIONAL ALGORITHM ALTERING INCOMING DATA | ns
SILENT APPLICATION STATE DRIVEN SOUND AUTHORING SYSTEM AND METHOD

REFERENCE TO MICROFICHE APPENDIX

Included with and forming part of this specification is a microfiche appendix, including 9 sheets of 815 total frames.

REFERENCE TO COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a system and method for providing sounds to be rendered in real-time to accompany a silent computing application.

Silent computing applications are those that do not produce sounds as their primary functions but which can become more informative when the production of sounds is added to their interfaces and displays. Many silent applications are interactive and involve real-time graphical displays. Computer animation applications, computer based games, Internet browsers, digital multimedia production applications and scientific visualization software are examples of silent applications. These applications may be implemented in hardware or software.

Several different techniques have been used to add sounds to or incorporate sounds with silent applications. These prior techniques may be characterized as falling into one of the two general categories of conventional approaches shown in FIGS. 1 and 2.

Figure 1:
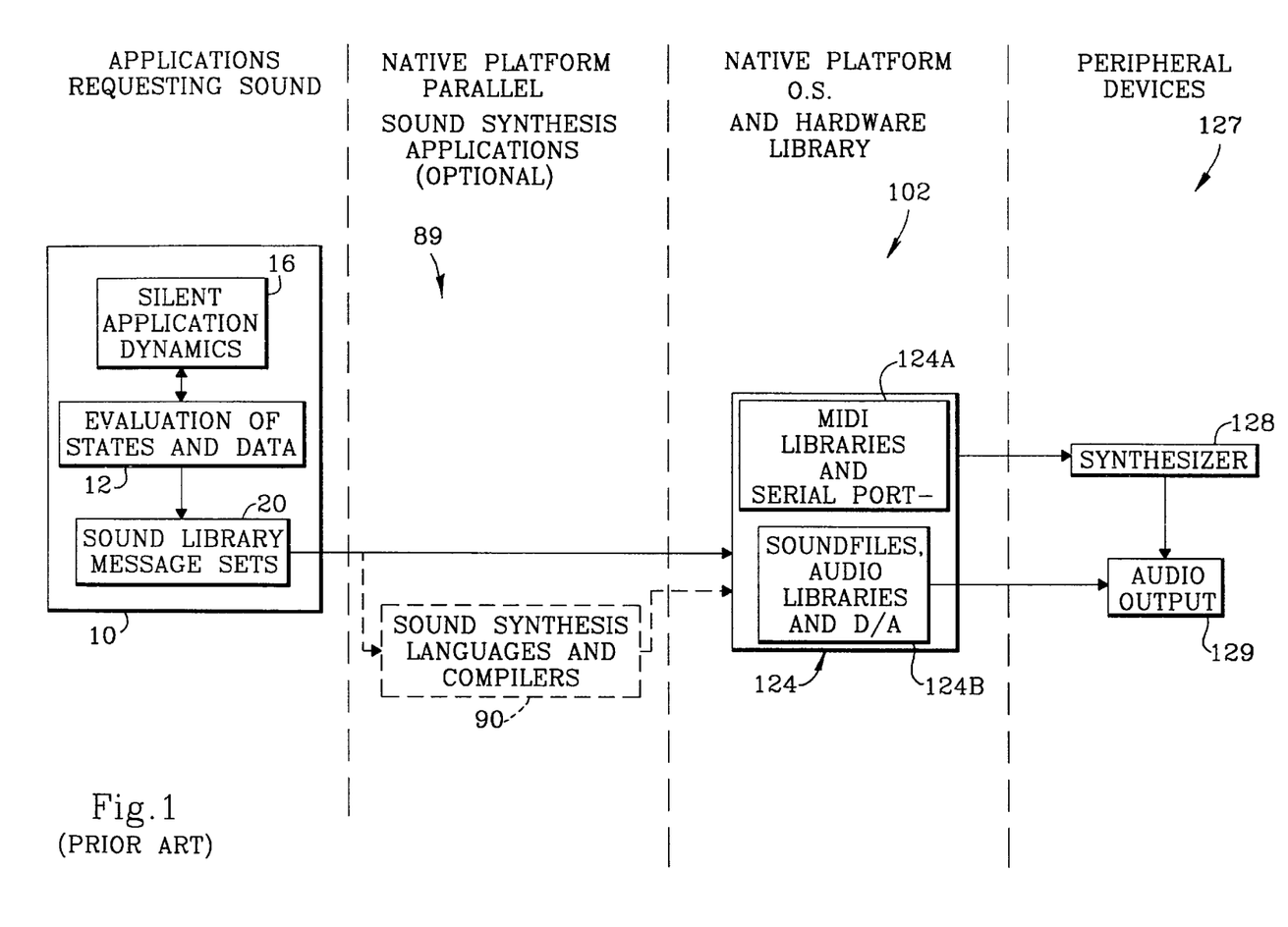
FIG. 1 is a block diagram of one type of prior art computer architecture for generating sounds in connection with a silent computer application that requests sound.

The block diagram of FIG. 1 represents one general category of existing, conventional, off-the-shelf, interactive audio technologies for enhancing computing applications by adding sounds. In FIG. 1, a silent application 10 includes a routine 12 that evaluates dynamics 16 of the silent application 10. In response to the evaluation of the program dynamics 16, the silent application 10 sends function calls 20 to libraries 124A and 124B that are supported by the particular hardware operating system 102. These libraries 124A and 124B can generate sound in several ways: One way that the libraries 124A can generate sounds is by accessing audio playback functionality of the system, identifying a digitized sound stored in the system, and playing the sound in a linear fashion from beginning to end. Another way these libraries 124A can generate sound is by sending a MIDI message to a peripheral sound-generating device 127, such as an internal synthesis card or an external synthesizer 128, and producing a MIDI note event. Still another way these systems can generate sound is represented by the dotted line in FIG. 1. In this latter approach, sound is generated by the libraries 124 by accessing sound synthesis functionality 89 of the system, such as sound synthesis languages and compilers 90, sending a request to the system accompanied by parameter values if the system accepts them, and synthesizing and playing a sound event. This type of sound synthesis functionality is not available on many platforms.

In the first two approaches described above in connection with FIG. 1, no sound sample computation occurs in the computing platform. The third approach described above (i.e., the dotted lines in FIG. 1) represents the hypothetical presence of a software synthesis language capable of running in real-time on the computing platform. Existing synthesis languages are not in wide use in multimedia computing due to their idiosyncrasies, their computational intensity, and their lack of an intuitive interface for software developers.

A fundamental drawback of the general category of approaches represented in FIG. 1 is that they all enforce and assume a one-to-one relationship between a request for a sound and a sound synthesis event (many classes of sound cannot be created from a single sound synthesis event). These approaches further assume that the requesting application 10 will encode knowledge of audio library functions 124 to initiate and control sounds. Therefore, the requesting application 10 must encode specialized knowledge about sound function calls and specialized sequences of function calls to control the sounds if they are not self-contained single events.

Figure 2:
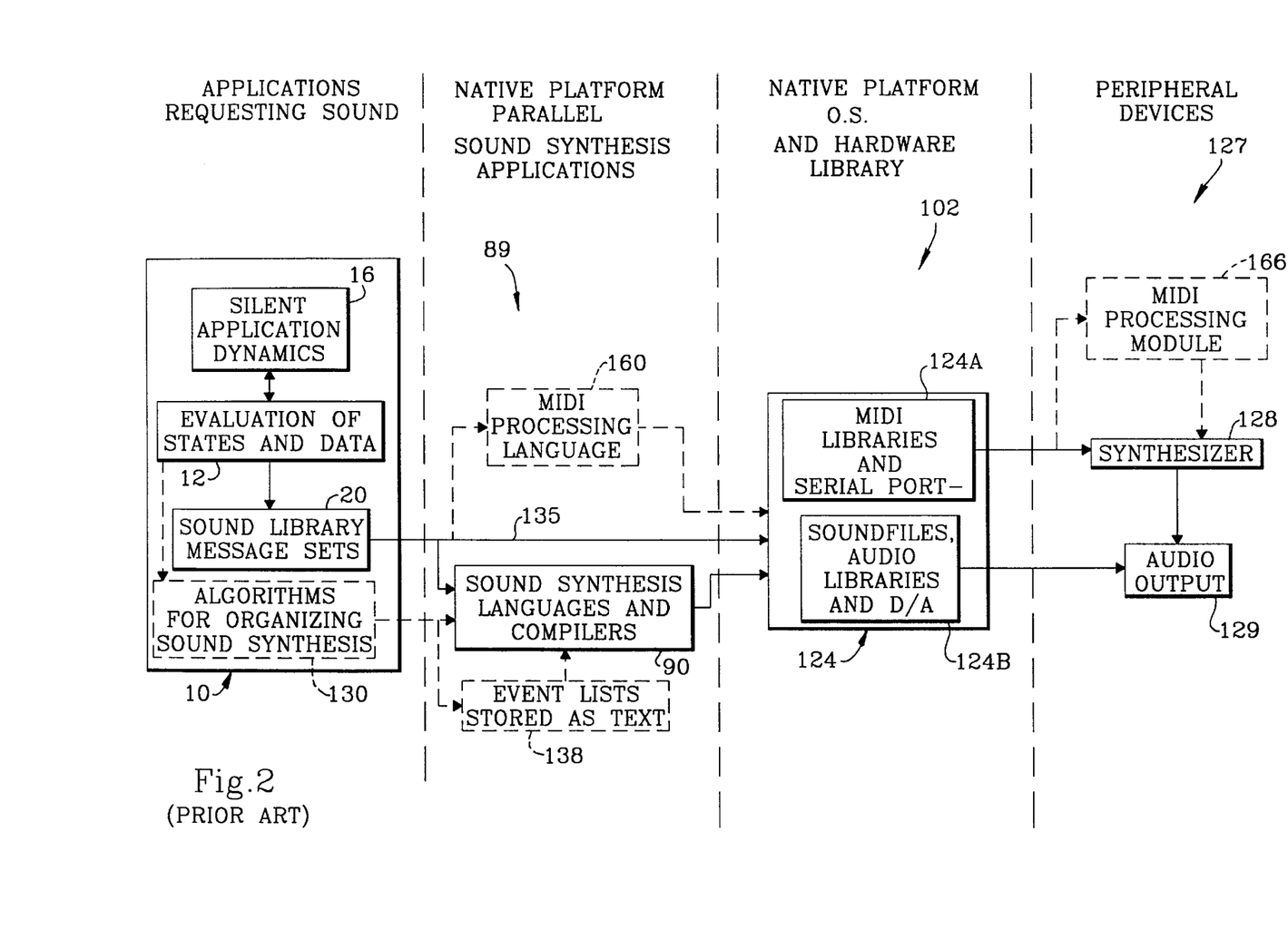
FIG. 2 is a block diagram of another of prior art computer architecture for generating sounds in connection with a silent computer application that requests sound.

A generally more sophisticated category of approaches to adding sounds to silent applications is represented by the block diagram of FIG. 2. The approaches represented in FIG. 2 may be used presently in professional media. Audio production standards in professional media utilize many layers of sound to create the auditory impression of a real-world acoustic space populated by sound-making objects and events. Professional sound production standards require multiple-event instruction sets instantiating and modifying multiple sounds in parallel. In an interactive application, these instruction sets need to be generated by algorithm. The approaches in FIG. 2 represent the application of conventional, existing technology to implement an event list/algorithm scenario. Dotted lines represent optional locations for computing sound control algorithms in the rendering path.

In FIG. 2, the algorithms 130 may be encoded in the sound requesting application 10. Digital control signal output may be sent to synthesis directly (e.g. via path 135) or stored in a file as an event list 138, which is a time-ordered script of synthesis instructions. Algorithms may also be encoded in another application residing on the host platform or on an external platform communicating via a serial or SCSI connection. The MIDI processing language MAX (labeled "160" in FIG. 2) is an example. In the case of MAX, numerical data pass from the requesting application 10 and MIDI messages are generated from algorithmic processes. As in the category of approaches in FIG. 1, the sounds may be generated by MIDI libraries 124A or soundfiles 124B that access peripheral devices 127, such as synthesizers 128 or a MIDI processing module 166, to provide an audio output 129.

A disadvantage of the approaches depicted in FIG. 2 is that the location of specialized audio domain knowledge in the code of a silent application 10 is an impediment to software developers and a constraint on the flexibility of sound prototyping. In the category of approaches in FIG. 2, extensive interpretation for generating sounds needs to be encoded in the requesting application 10. This requires specialized knowledge, and it requires re-programming and recompiling the silent application 10 whenever one wishes to modify the rules for audio output.

A further disadvantage associated with the approaches of FIGS. 1 and 2 is that the conventional use of MIDI represents a significant reduction of control over the details of sound production. The MIDI protocol provides no encoding of specific synthesis instructions nor algorithms and places most of the dynamics of sound production beyond the control of a user. With the category of approaches depicted in FIG. 2, there is no memory location or language provided for describing a relationship between the dynamics of the silent application and the dynamics of sound production. Each dynamic resides in a separate memory location in a separate system defined in a separate language.

Accordingly, one object of the present invention is to provide a way to enhance a silent application by adding sound by means of a process that is flexible and easier-to-use than conventional methods. Another object of the present invention is to provide a software architecture that enables sophisticated audio enhancements to silent applications in a way that is configurable and expandable. Still another object is to describe the relationship between silent application dynamics and sound dynamics in a uniform language and to store that description in a uniform memory location.

SUMMARY OF THE INVENTION

To address the above concerns, the present invention provides a technology for describing sounds to be rendered in real-time to accompany a silent computing application. More specifically, the present invention provides a structure and method for organizing and defining relationships between sound-generating algorithms and silent applications. The sounds may be controlled by data from the silent application in order to correspond to states generated in the silent application. Further, according to another aspect there is provided a means to describe the relationship of dynamics in a uniform language for the generation of sound and to store that description in a uniform memory location.

"Sound authoring" as used herein refers to the process of creating correspondences between synthesized sounds and the anticipated states of a silent application. A correspondence may be defined by associating a state in the silent application to one or more sound synthesis control states. These associations are created in advance of the run-time performance of the silent application. During run-time, control signals (in the form of messages) are generated automatically when the corresponding states occur.

"Intelligent mixing/rendering" as used herein refers to the automation of functions performing seamless audio mixtures and transitions and controlled by states of a silent application. The silent application does not need to define these functions or have information about these functions, they are encoded in the rendering system.

DETAILED DESCRIPTION OF THE PRESENTLY PREFERRED EMBODIMENTS

Sound Authoring Architecture

Figure 3A:
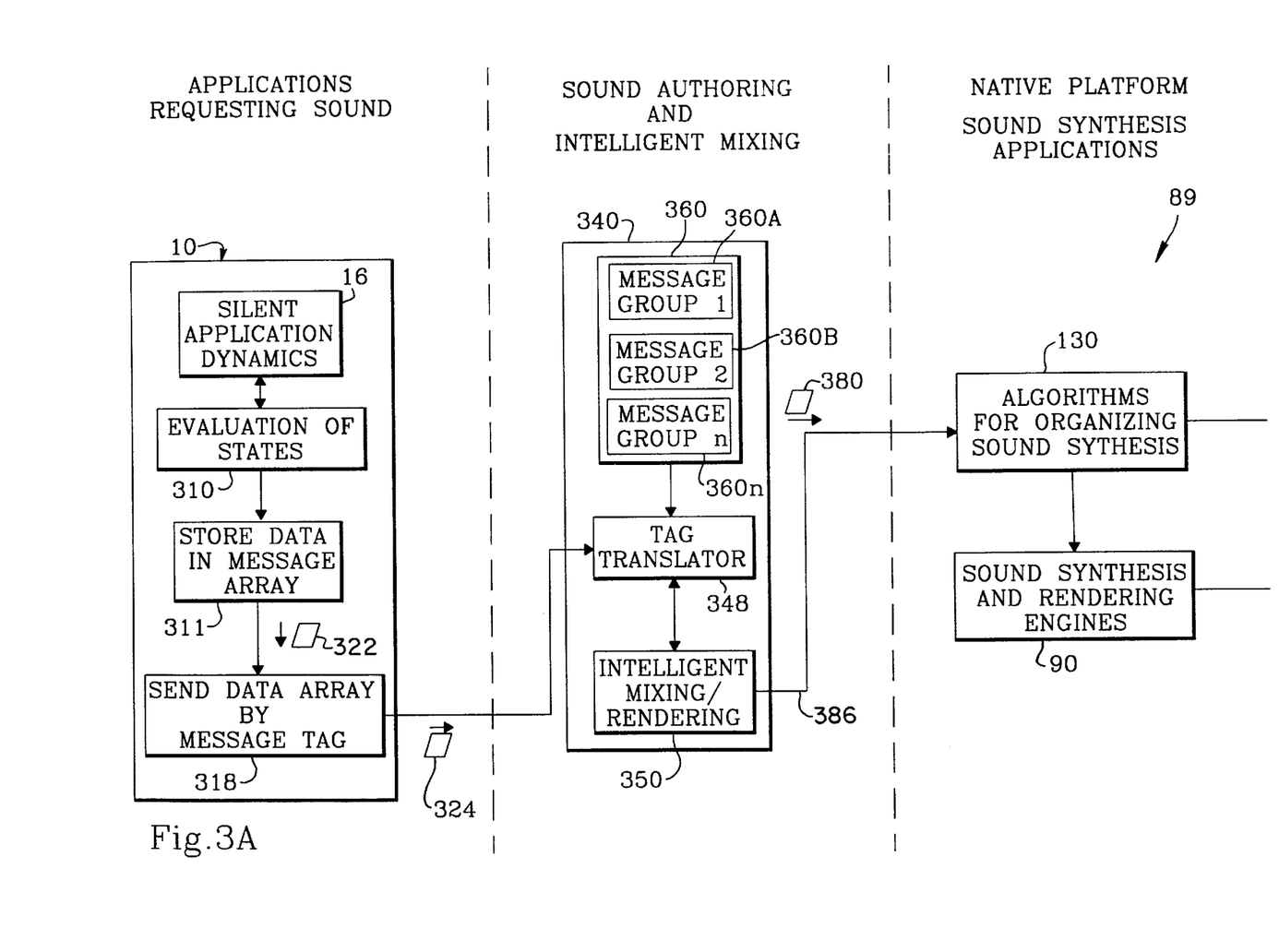
FIG. 3 is a block diagram of computer architecture for generating sounds in connection with a silent computer application that requests sound in connection with a first embodiment of the present invention.
Figure 3B:
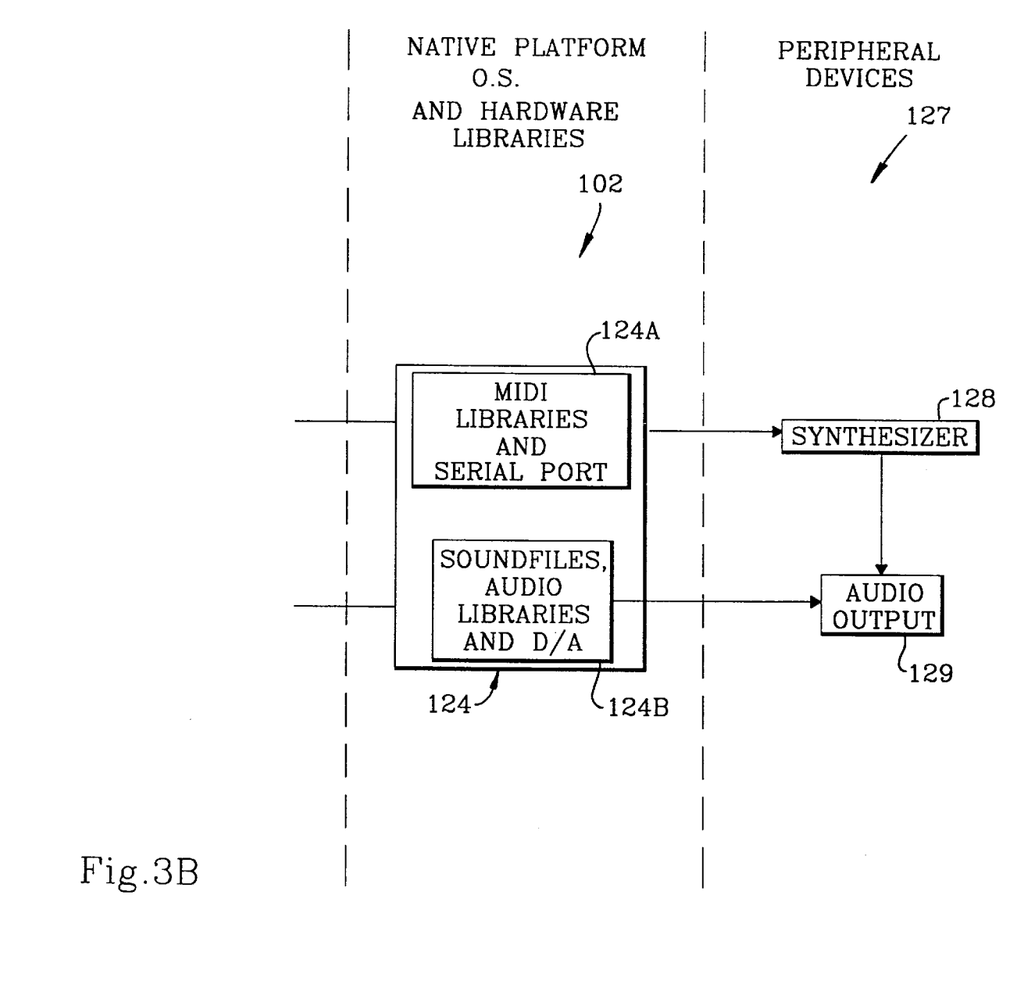

Referring to FIG. 3, there is a block diagram showing one embodiment of the present invention. FIG. 3 shows how the novel portions of the present embodiment relate to an existing silent application and sound synthesis components. A silent application 10 runs on a platform. The silent application 10 may be implemented in software or hardware. The silent application 10 may be any computer application that does not produce sound as its primary function. However, the silent application 10 is of a type can become more informative when sound is added to its interface and display. For example, the silent application 10 may be a computer animation application, a computer-based game, an Internet browser, a digital multimedia production application, or a scientific visualization application.

In FIG. 3, sound computation knowledge is relocated outside of the silent application 10 in a separate storage and communications structure referred to as a sound authoring structure 340. Source code for the sound authoring structure 340 is included in the microfiche appendix that forms a part of this disclosure. The sound authoring structure 340 includes one or more executable computer processes that are separate from the silent application 10. The sound authoring structure 340 has a unique memory space and provides a unique language for sound authoring. Also, the sound authoring structure 340 is implemented in a mechanism that is unique in the time order of events, and independent from the creation of the silent application. The sound authoring structure 340 comprises a new layer of organization providing the capability to describe and encode a relationship between the dynamics 16 of a requesting application (e.g., the silent application 10) and the dynamics of sound production.

To implement the sound authoring structure 340 as a process, the silent application 10 is modified to include certain new components or processes. Specifically, the silent application 10 is modified by adding a state evaluation component 310, a data storing component 311, and a message tag generation component 318. The state evaluation component 310 continuously or on a regular basis evaluates the state or condition of one or more aspects of the silent application 10. The state evaluation component 310 performs this function by monitoring the silent application program dynamics 16. (The state evaluation component 310 may be similar to the routine 12 mentioned above in connection with FIGS. 1 and 2.) Evaluation of the silent application dynamics 16 by the evaluation component 310 causes the data storage component 311 to store data representing the evaluated dynamics in a data array 322. The information stored in the data array 322 relates only to the state of the silent application 10 and does not include any specific information relating to sound.

The message tag generation component 318 generates a message tag 324. The message tag generation component 318 stores the data array 322 (generated by the data storage component 311) in the message tag 324. The message tag 324 includes no information or knowledge of sound production. The message tag 324 identifies a pre-selected state of the silent application and pre-selected data representing that state. The data 322 from the silent application 10 that may be useful for controlling a sound are transmitted with the message tag 324 to the sound authoring structure 340.

Optionally, the message tag generation component 318 may include data in the message tag 324 that indicates the time when the state represented by the data in the data array 324 occurs. Still further, in another alternative embodiment, the message tag generation component 318 may include multiple arrays of data in the message tag 324 and multiple time indications representing multiple states that occurred at multiple times corresponding to the multiple arrays.

The message tag 324 is sent by the message generation component 318 of the silent application 10 to the sound authoring structure 340. As mentioned above, the sound authoring structure 340 exists as a process separate from the silent application 10. The sound authoring structure 340 may be located on a remote computer networked to the computer on which the silent application 10 is running or may exist as a separate application running on the same platform as the silent application 10. Other alternative arrangements are described below.

The sound authoring structure 340 comprises a message tag receiving and translating component 348, an intelligent rendering and mixing component 350, and a collection 360 of one or more message groups 360A–360n. In the sound authoring structure 340, the message tag receiving and translating component 348 receives the message tag 324 from the message tag generation component 318 of the silent application 10. The message tag receiving and translating component 348 parses each of the message tags 324 that it receives. The message tag receiving and translating component 348 also notes the arrival time of each message tag 324.

For each message tag received, the message tag receiving and translating component 348 identifies the message group from the collection 360 of message groups that is associated with the message tag 324. The message group associated with the message tag 324 defines the sound production functions to be performed for that message tag. The message group also defines ways in which the incoming data in the array 322 are mapped into sound production messages. This flexibility in applying data from the silent application 10 is a significant advantage of the sound authoring process. The contents of each of the message groups determine which data from the corresponding message tag are used, how they are mapped, how many places they are used, and which data are not needed for a particular message configuration. The silent application 10 does not need to encode the mappings.

Message Groups

Figure 5:
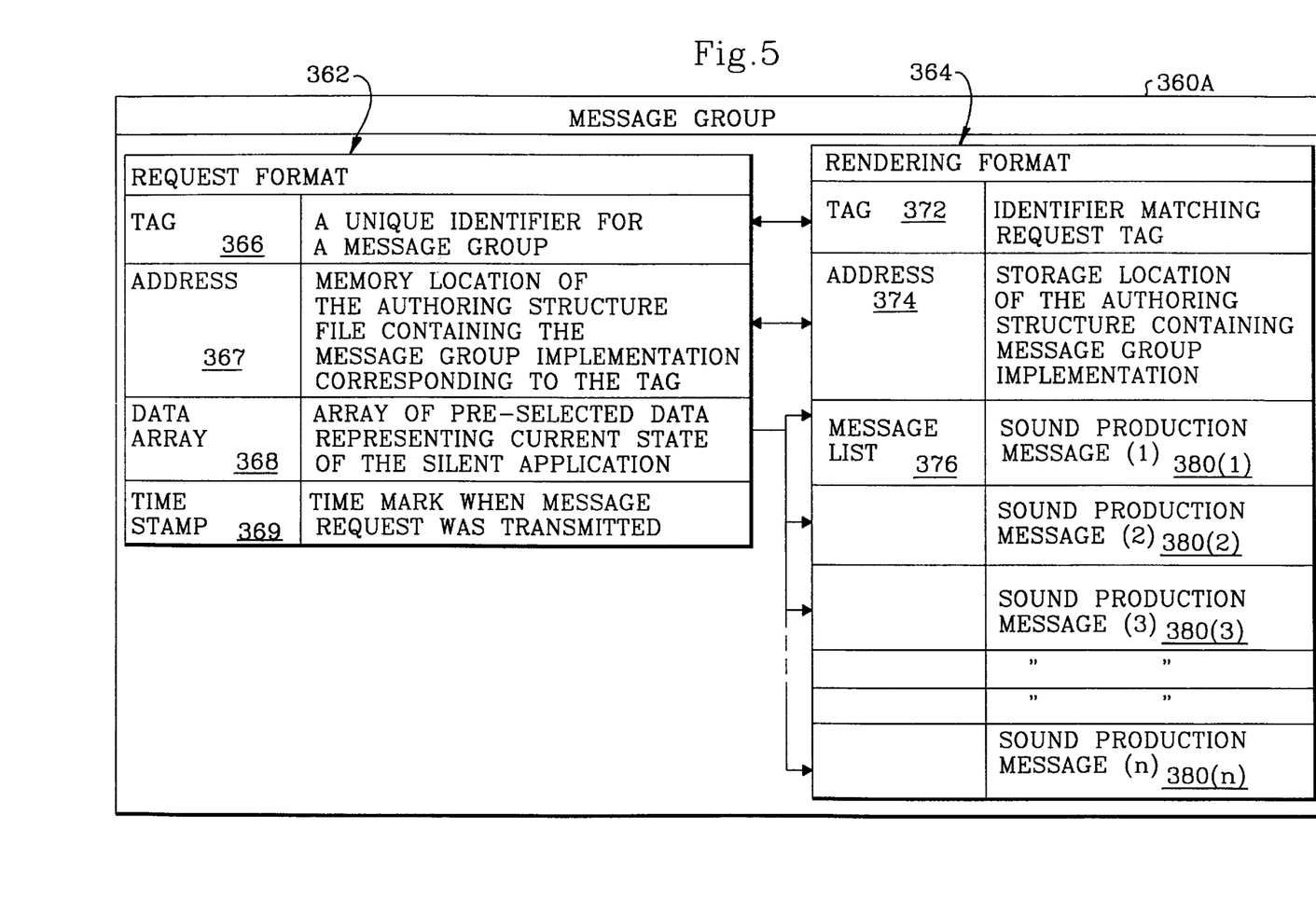
FIG. 5 is a table illustrating the format of a message group.

As mentioned above, the sound authoring structure 340 includes a collection 360 of one or more message groups 360A–360n. Each message group is a data transmission mechanism that consists of a request format and a rendering format. Referring to FIG. 5, the message group 360A is shown having a request format 362 and a rendering format 364. The request format 362 specifies data to be transmitted from a requesting application 10 to the synthesis system 90. The request format 362 corresponds to the structure of message tag 324. The data in the request format 362 include a tag 366, an address 367, a data array 368, and optionally, a time stamp 369. The tag 366 comprises a unique identifier for the message group 360A. The address 367 corresponds to the address in the sound authoring structure 340 where the message group resides, as explained below. The data array 368 corresponds to the data 322 in the pre-selected format that represents a state of the silent application 10 as determined by the state evaluation component 310 and stored by the storage component 311. The time stamp 369 includes data that represents the time when the message tag 324 was transmitted by the message tag generating component 318.

As mentioned above, each message group includes a rendering format that corresponds to the request format. In FIG. 5, the rendering format 364 is shown as corresponding to the request format 362. The rendering format 364 specifies the relation between the data from the silent application 10 and the dynamics of sound generation. The rendering format 364 includes a tag 372, a storage location 374, and a message list 376. The tag 372 is an identifier that matches the tag 366 in the request format 362. The address 374 includes a storage location of authoring data containing the implementation of the message group 360A. The message list 376 includes one or more sound production messages 380, such as sound production message 380(1), sound production message 380(2) . . . sound production message 380(n). The sound production messages 380 in the message list 376 define the relationships between the data 322 from the silent application and the sound rendering functions 90.

Figure 6:
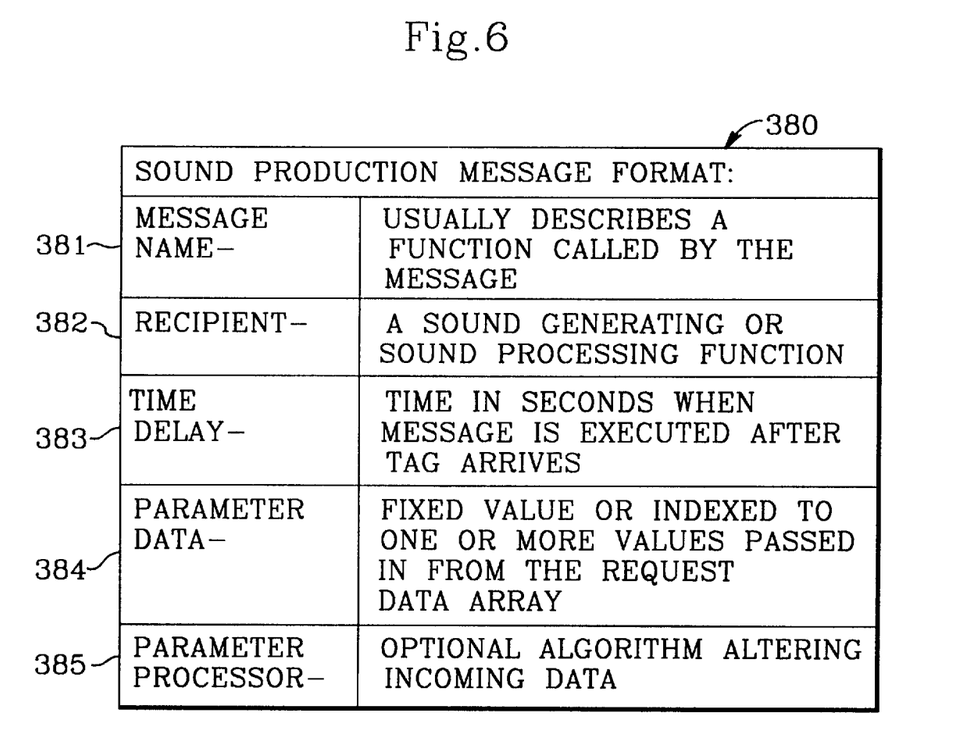
FIG. 6 is a table illustrating the format of a sound production message.

Referring to FIG. 6, each of the sound production messages 380 in the message list 376 has a similar format. Each of the sound production messages 380 includes data corresponding to the following: a message name 381, a recipient 382, a time delay 383, parameter data 384, and a parameter processor 385. The message name 381 usually provides an intuitive description of the actions performed by the message. The recipient 382 is the name of a sound generating or sound processing function (e.g. 130). The time delay 383 represents the time in seconds when the message is to be executed after arrival of the message tag 324. Parameter data 384 represents a fixed floating point or integer value, or provides an index to one or more values passed in from the request data array 368. (Note that the data in the data array 384 may be null in which case the recipient function 382 then operates with no external data other than the time of request 383.) Parameter processor data 385 includes an optional algorithm that may be used to alter the incoming data from the array 368. The algorithm may be used to re-scale the domain of the data in the array 368 (corresponding to array 322) to fit the appropriate range of the recipient function 130.

Dividing each of the message groups into two formats enables the specialized sound production knowledge to be located in the sound authoring system 340 rather than in the requesting silent application 10, while maintaining synchronous organization of request application states 16 and sound production messages.

Referring again to FIG. 3, the sound authoring structure 340 provides an output 386 that is used to control the generation of sound. The output 386 of the sound authoring structure 340 is provided in the form of sound production messages 380 generated by the rendering format 364. The output 386 of the sound authoring structure 340 is forwarded to algorithms 130 that are used to organize sound rendering engines 90. These algorithms 130 and sound synthesis engines 90 may be of any type, including conventional MIDI or other sound synthesis and rendering engines, and may even include types of sound generation functions that may be developed in the future. The algorithms 130 and/or sound synthesis engines 90 are used in turn to control MIDI or other audio libraries 124. These libraries 124 may also be conventional and may provide outputs through appropriate connections, such a serial port connection or a D/A converter, to peripheral sound generating equipment 127, such as a conventional synthesizer 128 to provide an audio output 129.

Process for Making and Operating the Sound Authoring Structure

Figure 4A:
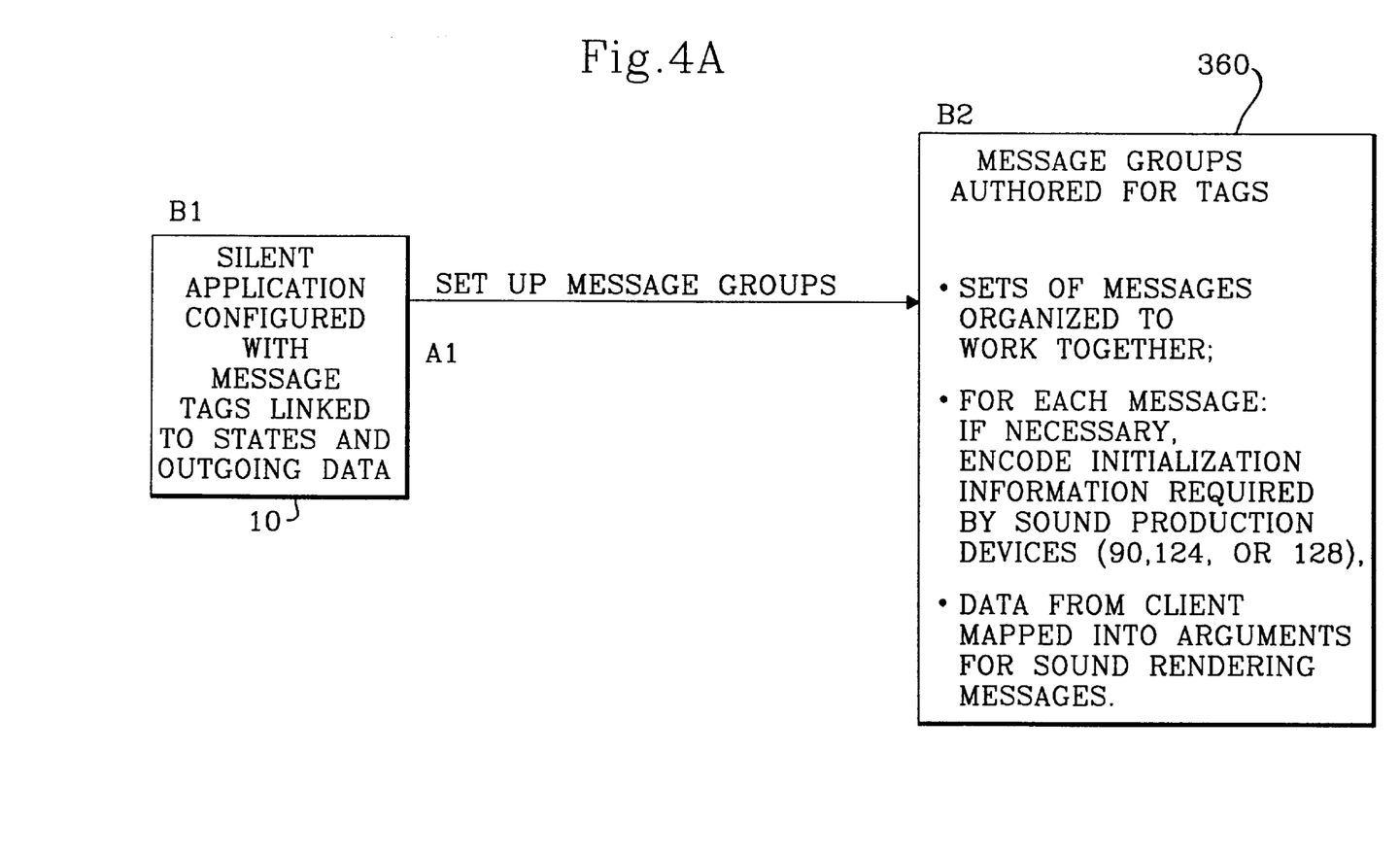
FIGS. 4A–4C are block diagrams illustrating steps for setting up the embodiment of the sound authoring structure with the silent application of FIG. 3.

Referring to FIGS. 3 and 4A, prior to compilation or running of the silent application 10, the silent application 10 is designed and prepared to generate the information needed for the sound authoring structure 340. This includes the preparation of the state evaluation component 310, the data storage component 311, and the message tag generation component 318 and adding these components to the silent application 10. Prior to the compilation of the silent application 10, the dynamics 16 of the silent application 10 are evaluated to identify potential states of the silent application 10 that might generate sound. Tags are defined and associated with the states of the silent application that may generate sound. Tags do not contain any information specific to the sound production. Data which may help characterize a state for sound synthesis are designated that characterize the state of the silent application 10. These data are collected in the state evaluation component 310 which is included in the silent application 10. After all the states in the silent application 10 are identified and tags are associated with the potential states, the silent application (including the state evaluation component 310, the data storage component 311, and the message tag generation component 318) may be compiled or otherwise made executable such as by encoding in a microchip.

Prior to running the silent application 10, the sound dynamics are composed by preparing the message groups 360A–360n. As mentioned above, these message groups 360A–360n are located in the sound authoring structure 340 which is separate from the silent application 10. Therefore, the preparation and configuration of the message groups 360A–360n can be done independently from that of the silent application 10. A message group is created corresponding to each message tag established in the message tag generation program 318 in the silent application 10. Synthesis instructions are organized with respect to the evaluation of the dynamics of the silent application. For each tag, sound rendering messages 380 are specified to render sound when the corresponding tag is identified in a request during run-time. Sound rendering messages 380 designate transfer functions or time functions that convert the data (e.g. 322) describing the state of the silent application 10 into arguments for controlling sound. Sound rendering messages may also contain as arguments fixed values which are not obtained from the data 322, or alternatively, the sound rendering messages may contain no arguments. Initialization procedures may be required to prepare the sound production device (e.g., 90, 124 or 128). These procedures may be encoded here as a portion of the authoring structure for the message group.

Figure 4B:
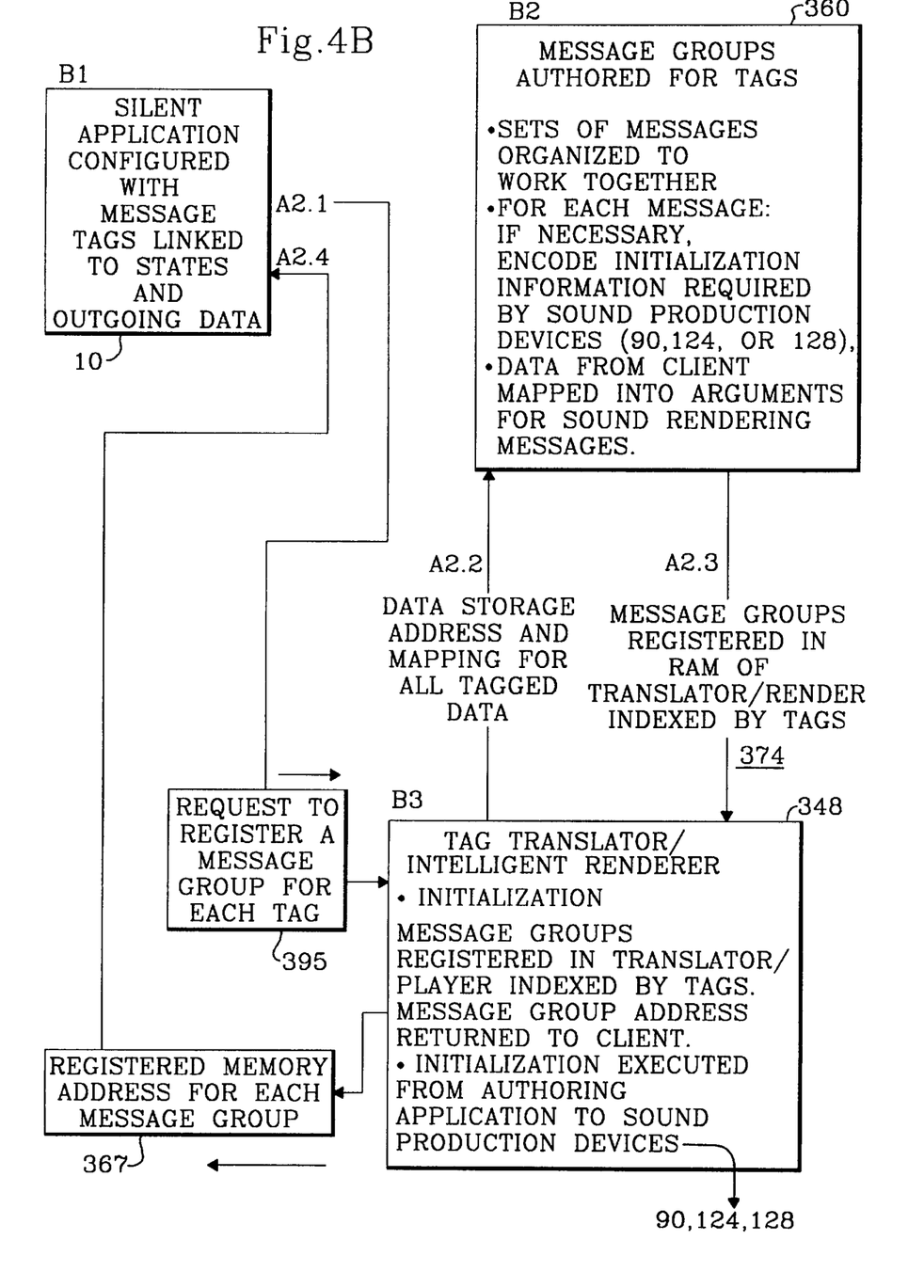

Referring to FIGS. 3 and 4B, at start-up time of the silent application 10, the silent application 10 sends an initialization message request 395 to register a message group for each message tag. The tag translator 348 checks the collection of message groups 360 and requests data storage addresses (e.g. storage location 374) and mapping for all tagged data. In response, the message groups 360 are registered in the RAM of the computer platform upon which the tag translator 348 and intelligent mixer/renderer 350 are running. The message groups 360 are indexed by their tags in the RAM of the computer platform upon which the tag translator 348 and intelligent mixer/renderer 350 are running. The tag translator 348 then returns to the silent application 10 the registered memory address 367 of each message group registered in its RAM. As part of 4B, all initializations required to prepare sound production devices for executing message groups are carried out.

Figure 4C:
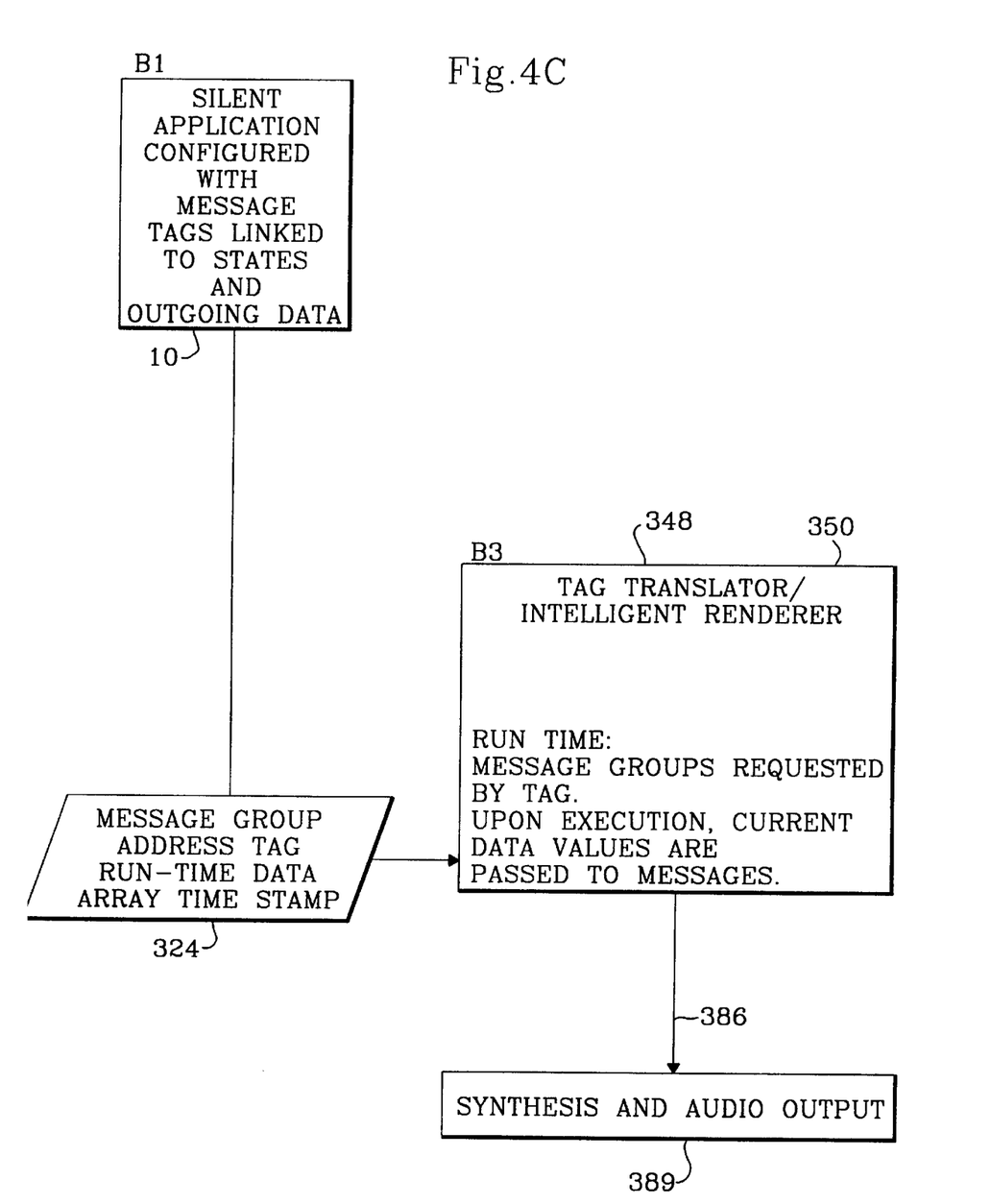

Referring to FIGS. 3 and 4C, during run-time of the silent application 10, the states (i.e. dynamics 16 in FIG. 3) of the silent application are evaluated by the state evaluation component 310. Then, the message sending component 318 sends message tags 324 to the tag translator 348 in the sound authoring structure 340. The message tags 324 include the message group address 367, the tag 366, the run-time data array 368 (corresponding to the data 322 generated by the state evaluation component 310), and, optionally, the time stamp 369.

Upon receiving each message tag 324 from the silent application 10, the tag translator 348 parses the message tag (as described above) to extract at least the message group address 367 and the run-time data array 368 (corresponding to data 322). Using the memory group address 367, the tag translator 348 passes the data array 368 (corresponding to data 322) to the intelligent mixer/renderer 350. The intelligent mixer/renderer 350 then uses the data from the data array 368 (corresponding to data 322) to render data into the appropriate sound production messages 380 in the message list 376 associated with the message group 360. The sound production messages 380 are used to generate and control sound synthesis production, such as sound synthesis algorithms or functions, MIDI, etc.

During run-time of the silent application, the sound authoring structure 340 can be reconfigured to change the message groups in its local memory thereby allowing it to accept different message tags from the silent application. During run-time of the silent application 10, the types of sounds that the silent application need may change. For example, if the silent application is a computer game, different sounds may be needed at different levels. If the silent application is a virtual environment, different sounds may be required in different parts of the virtual environment. Although it is possible that the sound authoring program could register all possible message groups in its local memory at run-time, it would be generally more efficient to register only those message groups needed by the silent application during a particular stage of operation of the silent application. Accordingly, a present embodiment of the sound authoring program provides for the ability to close message groups that had been previously registered in local memory thereby freeing up the local memory of the sound authoring structure so that different message groups can be registered.

As described above, during an initialization process, a request message 395 is sent by the silent application 10 to register a message group for each message tag that the silent application expects to send to the sound authoring program (see, FIG. 4B). In response, the sound authoring program returns the message 367 that includes the memory addresses in the sound authoring structure 340 where each of the corresponding message groups can be found. Thereafter, when the silent application 10 sends message tags to the sound authoring structure 340, they refer to memory addresses associated with the corresponding message groups.

During run-time of the silent application 10, when one or more message groups are no longer needed, the silent application can send a message to the sound authoring structure to close the unneeded message groups. This message can identify the message groups to be closed by the local memory addresses in the sound authoring structure that had previously been provided to the silent application during initialization of the message groups. In this manner, the memory in the sound authoring structure 340 can be freed up.

Subsequently, at any time during run-time of the silent application, additional message groups can be initialized provided that sufficient memory is available in the sound authoring structure. Additional message groups are initialized in the same manner as described above.

Multiple Authoring and Scalable Authoring

For a given state of a silent application and its corresponding message group request format, more than one message group rendering format may be supplied. Multiple rendering formats may be alternated during run-time of the silent application, permitting a designated state of the silent application to generate different sounds at different times according to the real-time specification of the user. In a variation of this functionality, different rendering formats for a given request format may be designated by the user at initialization time, according to the capabilities of the available sound production devices. This designation may also occur automatically when the sound authoring system detects the presence of particular sound production devices. In this way, the sound authoring system may scale the sound production demands made by a silent application according to the available sound production capabilities. In a further variation, new sound rendering formats may be authored for new sound production devices that may become available well after the completion of a silent application. Note that in these variations, no change at all is required in the executable silent application.

Networked Embodiment

Figure 7:
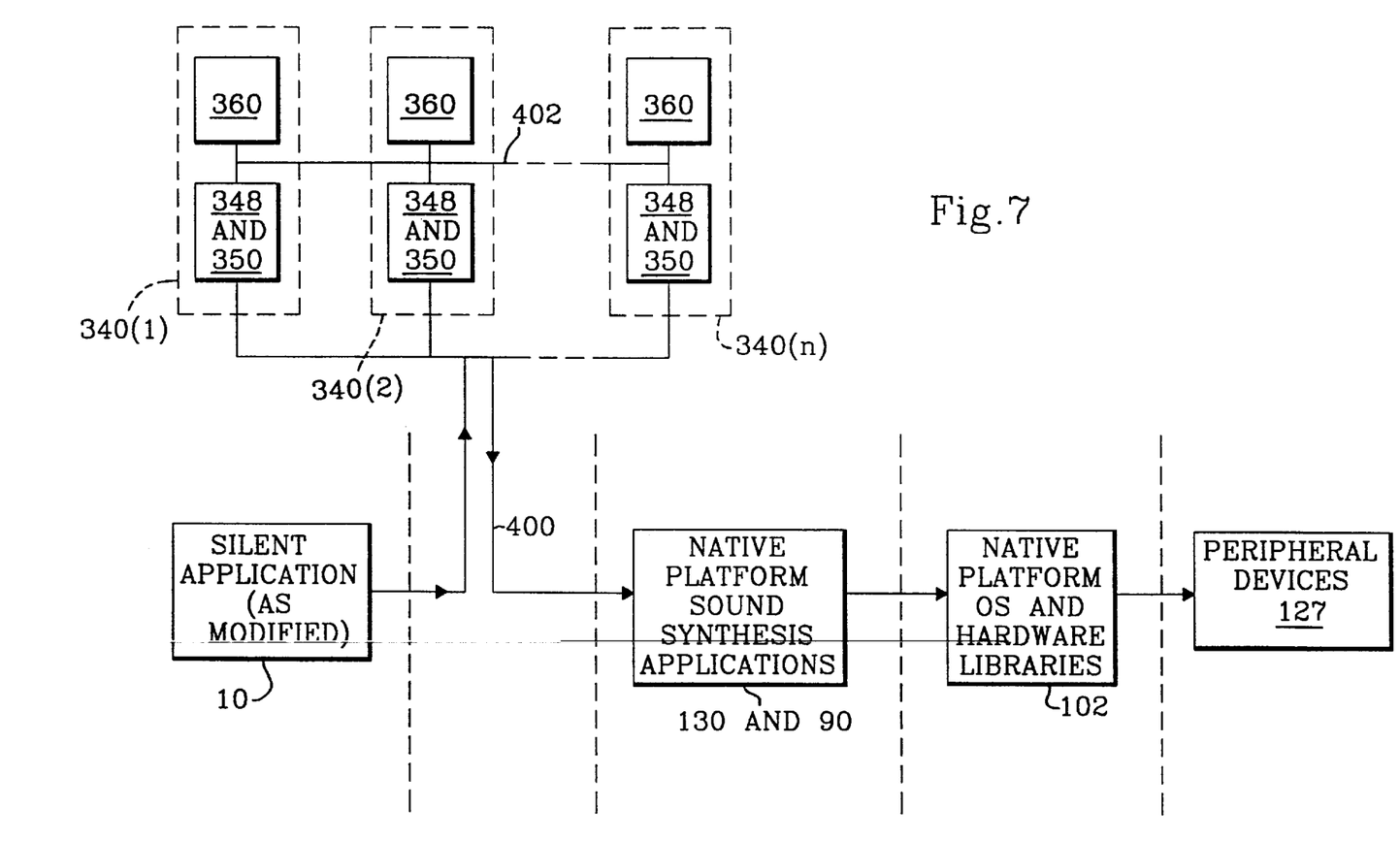
FIG. 7 is a block diagram showing an alternative embodiment implemented in a distributed parallel architecture using networked platforms.

Referring to FIG. 7, an embodiment of the sound authoring system is illustrated in a networked environment. As in the previously described embodiment, a silent application 10 is modified to include routines that evaluate the dynamics of the silent application and provide message tags including data arrays representing the evaluated dynamics. The message tags are transmitted to one or more sound authoring structures 340(1), 340(2) . . . 340(n) via a network 400. The network 400 may be of any type including a local or wide area network or even the Internet. Each of the sound authoring structures 340(1) . . . 340(n) may be similar or identical to the sound authoring component 340 described above. As in the embodiment described above, each of the sound authoring structures 340(1), 340(2) . . . 340(n) includes a collection of message groups. The collections of message groups used by the separate sound authoring structures 340(1), 340(2) . . . 340(n) may also be connected to their respective message tag receiving components 348 by means of a network 402 (which may also be coupled to or part of the network 400). Each of the sound authoring structures 340(1), 340(2) . . . 340(n) provides sound rendering messages 380 which are transmitted via the network 400 to the sound rendering functions 90 on the native platform of the silent application. Alternately, the sound rendering function 90 may be located on the networked platforms of sound authoring applications 340(1), 340(2) . . . 340(n). The sound rendering functions 90 may be used to provide sound via conventional means, as described above.

One of the advantages of the networked arrangement represented in FIG. 7 is that each of the sound authoring structures 340(1), 340(2) . . . 340(n) may configured at run-time to receive different message tags from the silent application. In this manner, a greater number of different message tags can be accommodated at one time.

(In another alternative embodiment, the arrangement of multiple sound authoring structures 340(1)–340(n) in FIG. 7 can be implemented in a multi-tasking environment on a single platform such as a supercomputer containing multiple processors.)

EXAMPLES

The following examples illustrate implementation of the sound authoring structure in conjunction with different silent applications.

Example 1
Adding Sound to Animation Production Software

This example employs a configuration known as a plug-in or helper application, which links to a main application at run time. The concept of a specialized helper plug-in is standard to commercial software architecture. The silent application in this example is a commercial application for producing computer graphic animation and operates with a plug-in application that communicates the states of the primary animation application to the sound authoring application. Together, the main and plug-in applications comprise the silent application (10 in FIG. 3).

Prior to automated sound production, an animation tool set is examined for states it may generate in an unspecified animation. The states of the animation that might be coupled to sound authoring include the frame number in an animation sequence; the position of objects in a scene (absolute or with respect to a camera position); dynamical information such as collisions, angles of motion, rates of motion; changes to the structure of a graphical object; and changes in lighting, color or textures mapped to the surfaces of objects. Higher-level models such as the emotional states of a character can also be employed.

In the helper plug-in, sound authoring message arrays and tags 311 are created. Authoring data (B2, 360 in FIG. 4A) are created to associate sound production messages with states and their combinations.

At start-up, the plug-in transmits a request 395 to the sound authoring application (B3 in FIG. 4B) which is operating on the same computer or on a nearby computer. The plug-in retains the registered memory address (367 in FIG. 4B) returned from the sound authoring application (B3, 348 in FIG. 4B).

During run-time, the states of the primary silent application (FIG. 3, 10) are evaluated (310, 311) and stored in the helper plug-in (322). The plug-in contains a module (318 in FIG. 3) that transmits tags 324 to the sound authoring application (348, B3 in FIG. 4B, 348 in FIG. 3).

A special state is often employed in the silent application, which causes an animation sequence under construction to play in time order and perhaps repeat, or reverse ordering. During this state, sounds are produced corresponding to the designated events in the sequence. The sounds remain synchronized with individual events even when the animation play rate varies, as it often does in real-time reproduction of sequences.

As new animation objects or events are created, new sounds may be associated with them at the decision of the animator. The animator may evaluate the sounds and the application provides a capability for adjustments to the sound authoring data to be made based upon the performance of the sounds with the specific animation. These adjustments may be performed without exiting the application.

The completed authoring information may be exported in a format that is compatible with its use coupled to the animation in subsequent display environments, such as in virtual reality, on a web browser page, or on film or videotape. The sound may be recorded from the authoring information into a sound file that may be synchronized to the completed animation in a linear display medium.

Example 2
Adding Sound to a Web Browser

Like the previous example, this example employs a plug-in or helper application which links to a main application at run time. In this example, the main application is a web browser used for displaying documents and executing applications accessed using the World Wide Web. The helper plug-in application gathers sound authoring information from the main application and transmits it to the sound authoring application. Together, the web browser and plug-in comprise the silent application (B1 in FIG. 4A, 10 in FIG. 3). A sound-producing plug-in for a web-browser is known, but the use of a plug-in for sound authoring is novel.

Prior to automated sound production, the web browser is examined for states it may generate as a user accesses and displays information. The states of the web browser that might be coupled to sound authoring include absolute location of a document in the World Wide Web network (referred to by its Universal Resource Locator address); part or all of the path of previous URL positions which the user has visited during a session; the relative difference from a user's current URL location to the URL location of a document—measured in units of URL location hierarchies known as directories; the relative URL location of one document measured with respect to the URL of other documents; real-time events created by mouse movements or the changes in other control devices; the position of a user's cursor within a document; the rate of change with which a user moves a cursor through a document or moves from one document to another; and events created by state changes in plug-in helper applications that are initiated from the browser. The plug-ins perform tasks such as presenting animations or other real-time processes.

In the sound authoring plug-in, tags and memory for message arrays 311 are created. When a silent web document is created, certain of the available message tags 311 are selected and embedded in the document. Authoring data (360, B2 in FIG. 4A) are created to associate sound production messages with these tags and data arrays. This sound authoring data (360, B2 in FIG. 4A) are accessed through information stored in the silent web document. The data (360, B2 in FIG. 4A) may be located at the same URL location as the document which they are to accompany, even embedded in the silent document itself.

When a silent web browser application (10, B1 in FIG. 4A) is started, it opens a communication channel to the sound authoring application (348, B3 in FIG. 4B) which is operating on the same computer or on a nearby computer. Each time a new web document is accessed, if that document is equipped with sound authoring data (360, B2 in FIG. 4B), the web browser sound authoring plug-in executes a request (395 in FIG. 4B) to the sound authoring application (348, B3 in FIG. 4B) and a memory address 367 is returned from the sound authoring application (348, B3).

Once a web document has registered sound messages (360, B2 in FIG. 4B) with the sound authoring application (348, B3 in FIG. 4B), the web browser (10, B1) can provide information according to the interaction of the user and the document which are state changes in the browser (B1 in FIG. 4B, 10 in FIG. 3). The interaction information is evaluated (310, 311) and stored by the web browser sound authoring plug-in (322). The plug-in contains a module 318 and transmits message tag 324 to the sound authoring application (348, B3 in FIG. 4B).

Multiple sounds from multiple documents may be presented simultaneously, and the mixture of these sounds may be controlled automatically by the sound authoring application according to interactive events performed at the browser (10, B1) and rules for intelligent mixing provided by sound authoring data (360, B2 in FIG. 4A) and the sound authoring application (348, B3 in FIG. 4B).

A unique data format provided by the sound authoring data and the sound authoring application allows for a URL distance metric to be assigned to different documents by the creators of sound for those documents. The URL distance metric may then be used by the sound authoring data and the sound authoring application to determine the relative proximity of various documents from the URL location of the user, and to adjust the intelligent mixing of the sounds accordingly. This unique data format allows a user to hear multiple URL-located documents at the same time with their loudness adjusted to represent their relative distance in an acoustic simulation of spatial cues. As the user moves from one document to another the acoustic simulation of the spatial distribution of sound sources changes. For example, as the user approaches a document the sound of that document will become closer in the acoustic simulation and the sounds of other documents may recede.

A unique data format provided by the sound authoring data and the sound authoring application allows for sound authoring information associated with a document at URL location A to be excerpted and inserted into another document at URL location B. The sound authoring excerpt may be associated with a hypertext link icon: a graphic or text in document B that is connected to the URL address of document A in a protocol such as a hypertext link. Thus, when the user encounters the link icon in B, but has not yet chosen to activate that link, the sounds from A will be presented, as if the sounds are emitted from A at the other end of the link. This can be a useful method to enhance the information located at hypertext link icons.

Sounds will occur in synchronization with their associated interactive or automated browser-driven events.

Advantages of the Present Embodiments

The present embodiments differ and improve upon conventional sound production practices in digital media. Prior art such as MIDI, MAX, Csound and their off-the-shelf components are not replaced, but they are enhanced by a new organization paradigm and a new message-passing technology. The embodiments described above provide for authoring the relational dynamics between silent applications and sounds as a specific and unique entity and not merely as the by-product of messages passed from a requesting agent to a responding agent. The sound authoring concept, which makes the silent-sound relationship encoded and computable as a unique component of a digital media production system, provides for control of sounds to a degree that has been unavailable in systems of the prior art. Further, in the embodiment of the sound authoring structure, the relational dynamics between silent applications and sounds are defined as a specific and unique stage that can be independently refined, upgraded, modified, scaled, and developed apart from the silent application.

One feature of the disclosed embodiments includes the ability to synchronize sounds with graphics frame rates in real-time. Another feature of the disclosed embodiments includes the ability to extract data from silent applications and use that data to control sounds. Still another feature of the disclosed embodiments includes the ability to assemble continuous audio signals from multiple sources, using algorithms that create seamless mixtures and transitions automatically in response to the state changes of the silent application. Yet another feature of the disclosed embodiments includes the ability to transmit sound control commands from a silent application without encoding detailed sound synthesis instructions in the silent application. In addition, a feature of the disclosed embodiments includes the ability to allow the relationship between a silent application and a sound synthesis algorithm to be re-defined without performing any alterations to the code of the silent application.

The embodiments of the present invention disclosed above may be used in various silent applications, such as computer animation applications, computer based games, Internet browsers, digital multimedia production applications and scientific visualization applications, as well as other types of applications. This technology may also be implemented for non-interactive batch-mode applications where sound is rendered asynchronously with the computation of the states of the silent application.

The silent application and the sound authoring-rendering system may be implemented in either software or hardware. The silent application and the sound authoring-rendering system may be implemented on any platform of combination of platforms including Unix, Macintosh, PC, and so on.

It is intended that the foregoing detailed description be regarded as illustrative rather than limiting and that it is understood that the following claims including all equivalents are intended to define the scope of the invention.

We claim:

1. A system for authoring and providing sounds in real time in conjunction with running of a silent computer application program, wherein said silent computer application is capable of having a plurality of different pre-selected states, and wherein said silent computer application program comprises:
   a means for evaluating said pre-selected states of the silent computer program application;
   a means for storing data describing each of said different pre-selected states in a respective state-describing message array; and
   a means for sending a plurality of message tags, wherein each one of said plurality of message tags includes a respective one of said state-describing message arrays;
   and further wherein said system for authoring and providing sounds comprises a programming means for authoring and providing sounds, wherein said programming means exists as a process separate from said silent application, and wherein said programming means comprises:
   a message tag translating means comprised of:
      means for receiving said message tags from said sending means in said silent application; and
      means for parsing each of said message tags received by said receiving means to extract said state-describing message array therefrom; and
   means for mixing and rendering sounds comprised of
      a means for identifying a message group associated with each message tag identified by said parsing means;
      means for mapping said data from said state-describing message array of said message tag to at least one sound production message associated with said message tag by said message group; and
      means for sending said at least one sound production message to a sound rendering application.

2. The invention of claim 1 wherein each of said message tags further comprises data indicating a memory address at which the message group associated with said message tag is located.

3. The invention of claim 2 wherein said parsing means further comprises means for extracting said memory address from each of said message tags to transmit said state-identifying data to the message group associated with the respective message tag located at said memory address.

4. The invention of claim 1 wherein said message tag further comprises data indicative of when the state associated with the message tag occurs.

5. The invention of claim 1 wherein said sound production message comprises data corresponding to a message name, a recipient, a time delay, and at least one parameter.

6. The invention of claim 1 wherein said sound production message further comprises data corresponding to a parameter processor for altering an incoming parameter.

7. The invention of claim 1 wherein said each of said message tags further includes a memory address corresponding to a location in a memory of a computer upon which said programming means for authoring sounds is running, wherein the respective message group associated with said message tag is stored at the memory address.

8. The invention of claim 1 wherein said each of said message tags further includes a message tag identifier.

9. The invention of claim 1 wherein said silent application is selected from a group consisting of: computer animation applications, computer-based games, Internet browsers, scientific visualization, and digital multimedia production applications.

10. The invention of claim 1 wherein said system for authoring and providing sounds comprises a programming means for translating and rendering sounds, said programming means further comprising:
   means adapted to provide to said silent application a memory address of a message group in response to an initialization request message identifying message tags to be used by the silent application.

11. The invention of claim 1 wherein said programming means for translating and rendering sounds further comprises a plurality of message groups each of which is associated with a separate one of said message tags.

12. The invention of claim 1 wherein each of said message groups comprises a request format and a rendering format, and wherein said request format corresponds to and defines the data in the message tags and wherein said rendering format defines how the data in a message tag are used in at least one sound production message defined in said rendering format.

13. The invention of claim 1 further comprising a network interconnecting said message tag translating means and said silent application.

14. The invention of claim 1 further comprising at least one additional message tag translating means adapted to receive message tags from said silent application and provide sound production messages to said sound rendering application.

15. The invention of claim 1 wherein said silent computer application is a web browser and wherein said programming means comprises a plug-in for said web browser and wherein said programming means and said message group assign a distance metric indicative of a relative proximity of data represented by a uniform resource locator to data displayed by said web browser.

16. The invention of claim 1 wherein said silent computer application is a web browser and wherein said programming means comprises a plug-in for said web browser and wherein said programming means and said message group associates sounds with hypertext links so that when one of said hypertext links is displayed by said web browser in a document, a sound associated with said one of said hypertext links is rendered.

17. A system for providing sounds for a silent computer application program, wherein said silent computer application is capable of having a plurality of different pre-selected states, and wherein said silent computer application program comprises:
   a first programming means included in said silent application, said first programming means adapted to evaluate the pre-selected states of the silent computer program application and provide data corresponding to said pre-selected states; and a second programming means included in said silent application and adapted to transmit request messages wherein each of said request messages includes said data corresponding to said pre-selected states;

and wherein said system further comprises:

at least one message group existing separately from said silent application, said message group including a request format and a rendering format, wherein said request format defines an arrangement of data in said request messages and wherein said rendering format defines how said data in said request format are mapped to sound rendering messages;

a third programming means existing as a separate process from said silent application, said third programming means comprising:

a fourth programming means adapted to receive said messages from said second programming means and associate each of said request messages with a corresponding message group; and a fifth programming means adapted to map said data from said request message to sound production messages using the message group corresponding to said message request.

18. A method or providing sound in conjunction with the running of a silent computer application program, comprising the steps of:

prior to running the silent application, identifying states of said silent application having the potential for being associated with sound generation and identifying data describing said states;

associating a message tag with each of said states;

in a separate application, composing a message group corresponding to each message tag; wherein each message group includes sound rendering messages specified to render sound associated the corresponding tag message, wherein said sound rendering messages include transfer functions and time functions;

at start-up time of the silent application, initializing the message groups in an intelligent renderer application comprising the steps of:

registering each of said message groups;

indexing said message groups by their respective message tags;

returning to the silent application a memory address in a computer running said intelligent renderer for each message group;

at run-time of the silent application, evaluating said states of the silent application;

associating said states with the message tags previously associated therewith;

sending said message tags from the silent application to the intelligent renderer application wherein each message tag includes said data identifying a corresponding state of the silent application that had been evaluated;

in the intelligent renderer application, receiving the message tags sent by the silent application;

mapping data from each of the message tags received from the silent application to its corresponding message group;

calling the transfer functions in the corresponding message groups; and providing transfer function outputs to sound synthesis functions to generate sounds.

19. The method of claim 18 further comprising the step of:

at run-time, sending message tags to said intelligent renderer, each of said message tags including a memory address associated with its corresponding message group.

20. The method of claim 18 wherein for a given state of a silent application, there are a plurality of message groups associated therewith so that message tags are associated with one of said plurality of message groups, and at a subsequent time, said message tags are associated with another of said plurality of message groups.

21. A system for providing sounds for a web browser including a plurality of different preselected states, the system comprising:

software in the web browser that generates state describing messages concerning the state of the web browser and sends said state describing messages to a sound authoring application; and software in the sound authoring application for generating a request for sound production to a sound rendering application based upon an evaluation of said state describing messages; wherein said evaluation depends upon a distance metric indicative of relative proximity of data represented by a uniform resource locator to data displayed by the web browser.

* * * * *